(12) United States Patent
Mathew et al.

(10) Patent No.: US 8,406,294 B2
(45) Date of Patent: Mar. 26, 2013

(54) METHOD OF ASSIGNING PRIORITY FOR CONTROLLING BIT RATE OF BITSTREAM, METHOD OF CONTROLLING BIT RATE OF BITSTREAM, VIDEO DECODING METHOD, AND APPARATUS USING THE SAME

(75) Inventors: Manu Mathew, Suwon-si (KR); Kyo-hyuk Lee, Yongin-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1748 days.

(21) Appl. No.: 11/708,336

(22) Filed: Feb. 21, 2007

(65) Prior Publication Data

US 2007/0280350 A1    Dec. 6, 2007

Related U.S. Application Data

(60) Provisional application No. 60/786,023, filed on Mar. 27, 2006.

(30) Foreign Application Priority Data

May 30, 2006  (KR) .................. 10-2006-0048979

(51) Int. Cl.
*H04N 7/12* (2006.01)
(52) U.S. Cl. ........... 375/240.03; 375/240.1; 375/240.26; 370/336; 370/347; 370/465; 370/395.61; 370/395.64; 709/232; 382/243
(58) Field of Classification Search ............ 375/240.03, 375/240.1, 240.26; 370/336, 347, 465, 395.61, 370/395.64; 709/232; 382/243
See application file for complete search history.

(56) References Cited

U.S. PATENT DOCUMENTS

| | | | |
|---|---|---|---|
| 5,926,569 A * | 7/1999 | Nickerson | 382/232 |
| 7,630,570 B1 * | 12/2009 | Haskell et al. | 382/243 |
| 7,843,959 B2 * | 11/2010 | Kampmann et al. | 370/465 |
| 7,974,341 B2 * | 7/2011 | Chen et al. | 375/240.1 |
| 2003/0202579 A1 * | 10/2003 | Lin et al. | 375/240.03 |
| 2003/0215011 A1 * | 11/2003 | Wang et al. | 375/240.03 |
| 2006/0114990 A1 * | 6/2006 | Pak | 375/240.03 |

FOREIGN PATENT DOCUMENTS

| | | |
|---|---|---|
| KR | 10-2005-0085780 A | 8/2005 |
| KR | 10-2007-0013595 A | 1/2007 |
| WO | 02/069645 A2 | 9/2002 |
| WO | 03/075578 A2 | 9/2003 |
| WO | 2004/057876 A1 | 7/2004 |
| WO | 2005/057935 A2 | 6/2005 |

OTHER PUBLICATIONS

Communication dated Nov. 15, 2011 from the Japanese Patent Office in counterpart Japanese application No. 2009-502666.
http://wftp3. itu.int/av-arch/jvt-?site/2005_10_Nice/.

(Continued)

*Primary Examiner* — Thanhnga B Truong
(74) *Attorney, Agent, or Firm* — Sughrue Mion, PLLC

(57) ABSTRACT

A method of assigning a priority for controlling a bit rate of a bitstream having a plurality of quality layers is provided. The method includes composing first quality layers for a reference picture, composing second quality layers for a current picture that is encoded with reference to the reference picture, and assigning a priority each of the first and second quality layers, wherein a low priority is assigned to a quality layer having a small influence on a video quality reduction of the current picture when the quality layer is truncated.

17 Claims, 10 Drawing Sheets

OTHER PUBLICATIONS

Reichel, "Joint Scalable Video Model JSVM-4", Joint Video Team (JVT) of ISO/IEC MPEG & ITU-T VCEG (ISO/IEC JTC1/SC29/WG11 and ITU-T SG16 Q.6), 17th Meeting, Nice, France, Oct. 2005, pp. 1-23.

Wakui et al., "A study on scalable video coding by transcoding of coded video", 2003, pp. 1-6.

* cited by examiner

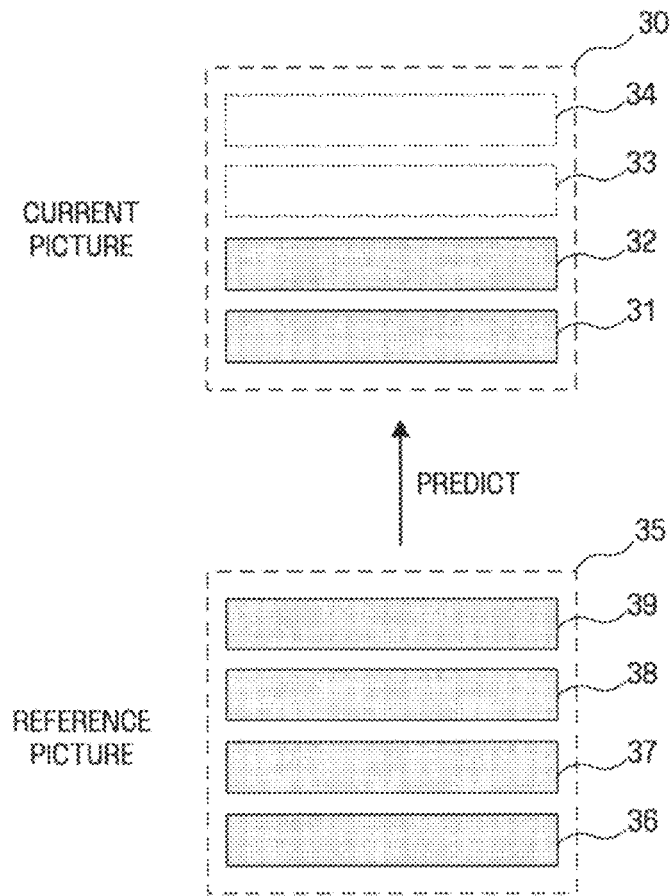
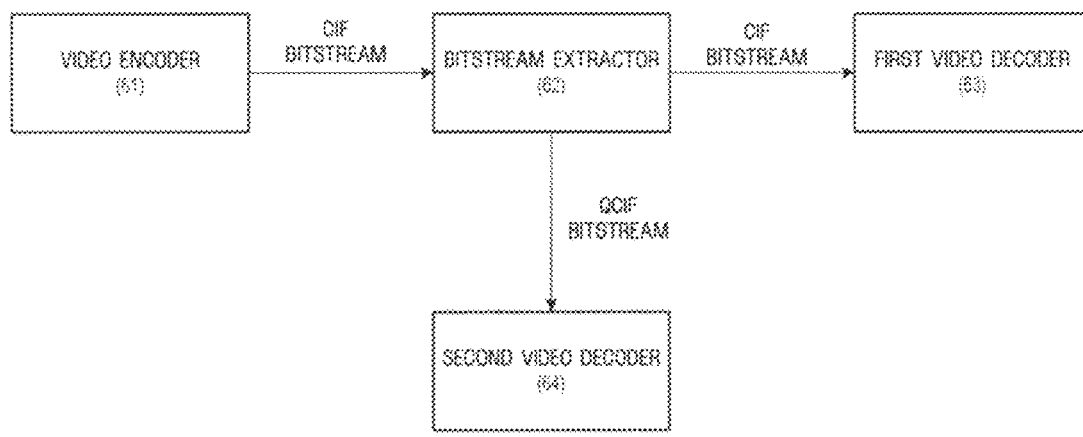

METHOD OF ASSIGNING PRIORITY FOR CONTROLLING BIT RATE OF BITSTREAM, METHOD OF CONTROLLING BIT RATE OF BITSTREAM, VIDEO DECODING METHOD, AND APPARATUS USING THE SAME

CROSS-REFERENCE TO RELATED APPLICATIONS

This application claims priority from Korean Patent Application No. 10-2006-0048979 filed on May 30, 2006 in the Korean Intellectual Property Office, and U.S. Provisional Patent Application No. 60/786,023 filed on Mar. 27, 2006 in the United States Patent and Trademark Office, the disclosures of which are entirely incorporated herein by reference.

BACKGROUND OF THE INVENTION

1. Field of the Invention

The present invention relates to a video coding technology, and more particularly, to a method of controlling a bit rate of a bitstream composed of a plurality of quality layers.

2. Description of the Related Art

With the development of information and communication technologies, multimedia communications are increasing in addition to text and voice communications. The existing text-based communication systems are insufficient to satisfy consumers' diverse needs, and thus multimedia services that can accommodate diverse forms of information, such as text, image, music, and others, are increasing. Since multimedia data is large, mass storage media and wide bandwidths are respectively required for storing and transmitting it. Accordingly, compression coding techniques are required to transmit the multimedia data.

The basic principle of data compression is to remove data redundancy. Data can be compressed by removing spatial redundancy such as a repetition of the same color or object in images, temporal redundancy such as similar neighboring frames in moving images or continuous repetition of sounds, and visual/perceptual redundancy which considers human insensitivity to high frequencies. In a general video coding method, temporal redundancy is removed by temporal filtering based on motion compensation, and spatial redundancy is removed by a spatial transform.

In order to transmit multimedia data after the data redundancy is removed, transmission media are required, the performances of which differ. Presently used transmission media have diverse transmission speeds. For example, an ultrahigh-speed communication network can transmit several tens of megabits of data per second and a mobile communication network has a transmission speed of 384 kilobits per second. In order to support the transmission media in such a transmission environment, and to transmit multimedia with a transmission rate suitable for the transmission environment, a scalable video coding method is most suitable.

The scalable video coding method is a coding method that can adjust a video resolution, a frame rate, and a signal-to-noise ratio (SNR), that is, a coding method that supports diverse scalabilities by truncating a part of a compressed bitstream in accordance with peripheral conditions such as a transmission bit rate, a transmission error rate, and system resources.

In the current scalable video coding (SVC) standard, expedited by the Joint Video Team (JVT), which is a joint working group of Moving Picture Experts Group (MPEG) and International Telecommunication Union (ITU), is based on H.264. The SVC standard contains fine granularity scalability (FGS) technology for supporting SNR scalability.

FIG. 1 shows an example of a scalable video codec using a multi-layer structure. Referring to FIG. 1, a first layer has a Quarter Common Intermediate Format (QCIF) resolution and a frame rate of 15 Hz, a second layer has a Common Intermediate Format (CIF) resolution and a frame rate of 30 Hz, and a third layer has a Standard Definition (SD) resolution and a frame rate of 60 Hz.

A layer correlation may be used for encoding multi-layer video frames that have various resolutions and/or frame rates. For example, an area 12 of a first enhancement layer frame is efficiently encoded through a prediction from an area 13, corresponding to the area 12, of a base layer frame. An area 11 of a second enhancement layer frame may be efficiently encoded through a prediction using the area 12.

FIG. 2 is a schematic diagram for explaining inter prediction and intra-base prediction of a scalable video coding method. A block 24 in a current layer frame 21 may be predicted with reference to a block 25 in another current layer frame 22, which is called inter prediction. The inter prediction includes motion estimation for obtaining a motion vector showing a corresponding block.

The block 24 may be predicted with reference to a block 26 in the low layer (base layer) frame 23 that locates at the same temporal position and picture order count (POC) as the frame 21, which is called an intra-base prediction. In the intra-base prediction, motion estimation is not required.

FIG. 3 illustrates an example of applying FGS to a residual picture through the prediction of FIG. 2. The residual picture 30 may be represented as a plurality of quality layers in order to support SNR scalability. These quality layers are needed to diversely express a video quality, which is different from the layer for resolutions and/or frame rates.

The plurality of quality layers may consist of one discrete layer 31 and at least one of FGS layers 32, 33 and 34. The video quality measured in the video decoder is the lowest when only a discrete layer 31 is received, followed by when the discrete layer 31 and a first FGS layer 32 are received, when the discrete layer 31 and the first and a second FGS layers 32 and 33, and when all layers 31, 32, 33 and 34 are received.

FIG. 4 illustrates a process of expressing a single picture or slice as one discrete layer and two FGS layers.

An original picture (or slice) 41 is quantized by a first quantization parameter $QP_1$ (S1). The quantized picture 42 forms a discrete layer. The quantized picture 42 is inverse-quantized (S2), and provided to a subtractor 44. The subtractor 44 subtracts the provided picture 43 from the original picture 41 (S3). The subtracted result is quantized again using a second quantization parameter QP2 (S4). The quantized result 45 forms the first FGS layer.

The quantized result 45 is inverse-quantized (S5), and provided to an adder 47. The provided picture 46 and the provided picture 43 are added by the adder 47 (S6), and provided to a subtractor 48. The subtractor 48 subtracts the added result from the original picture 41 (S7). The subtracted result is quantized again using a third quantization parameter $QP_3$ (S8). The quantized result 49 forms the second FGS layer.

Through the above operations, the plurality of quality layers as illustrated in FIG. 3 can be formed.

FIGS. 5A and 5B illustrate the quality layer truncating method used in the current SVC standard. As illustrated in FIG. 5A, a current picture 30 is expressed as a residual picture by being predicted from a reference picture 35 through the inter prediction or the intra-base prediction. The current picture 30 expressed as the residual picture consists of a plurality of quality layers 31, 32, 33 and 34. The reference picture 35 also consists of a plurality of quality layers 36, 37, 38 and 39.

According to the current SVC standard, a bitstream extractor truncates a part of quality layers in order to control SNR bitstreams as illustrated in FIG. 5B. That is, the bitstream extractor truncates quality layers of the current picture 30 that is located in high resolution and/or frame rate layer (hereinafter, referred to as "layer" to distinguish it from the "quality layer") from the highest and downward. After all the quality layers of the current picture 30 are truncated, quality layers of the reference picture 35 are truncated from the highest and downward.

The above truncation is best for reconstructing a picture (reference picture) of a lower layer (e.g., QCIF), but is not best for reconstructing a picture (current picture) of a high layer (e.g., CIF). Quality layers of some low layer pictures may be less important than those of high layer pictures. Accordingly, it is required that efficient SNR scalability be embodied by truncating quality layers according to whether a video encoder mainly aims at a high-layer picture or a low-layer picture.

SUMMARY OF THE INVENTION

The present invention provides a method and apparatus for controlling the SNR of a bitstream aiming at high layers.

The present invention also provides a method and apparatus for controlling the SNR according to whether a video encoder mainly aims at a high layer picture or a low layer picture.

According to an aspect of the present invention, there is provided a method of assigning a priority for controlling a bit rate of a bitstream, the method including composing first quality layers for a reference picture, composing second quality layers for a current picture that is encoded with reference to the reference picture, and assigning a priority to each of the first and the second quality layers, wherein a low priority is assigned to a quality layer having a small influence on a video quality reduction of the current picture when the quality layer is truncated.

According to another aspect of the present invention, there is provided a method of controlling a bit rate of a bitstream, the method including receiving a video bitstream, setting a target bit rate for the video bitstream, reading first quality layers for a reference picture and second quality layers for a current picture, and truncating from a quality layer having a low priority and upward, among the first and the second quality layers based on the target bit rate.

According to another aspect of the present invention, there is provided a video decoding method including receiving a video bitstream; reading first quality layers for a reference picture, second quality layers for a current picture, and dependency IDs of the first and the second quality layers; setting the dependency ID as indicating the highest quality layer of the first quality layers, if there is no quality layer indicated by the dependency ID among the first quality layers; and reconstructing the current picture according to a relation indicated by the dependency ID.

According to another aspect of the present invention, there is provided an apparatus for assigning a priority for controlling a bit rate of a bitstream, the apparatus including a reference-picture encoder that composes first quality layers for a reference picture, a current-picture encoder that composes second quality layers for a current picture that is encoded with reference to the reference picture, and a quality-level assigner that assigns a priority to each of the first and the second quality layers, wherein a low priority is assigned to a quality layer having a small influence on a video quality reduction of the current picture when the quality layer is truncated.

According to another aspect of the present invention, there is provided an apparatus for controlling a bit rate of a bitstream, the apparatus including a bitstream input unit that receives a video bitstream, a target-bit-rate-setting unit that sets a target bit rate for the video bitstream, a bitstream parser that reads first quality layers for a reference picture and second quality layers for a current picture, and a bitstream truncator that truncates from a quality layer having a low priority and upward, among the first and the second quality layers based on the target bit rate.

According to another aspect of the present invention, there is provided a video decoding apparatus including an entropy decoding unit that receives a video bitstream, a bitstream parser that reads first quality layers for a reference picture, second quality layers for a current picture, and dependency IDs of the first and the second quality layers, a dependency-ID-setting unit that sets the dependency ID as indicating the highest quality layer of the first quality layers, if there is no quality layer indicated by the dependency ID among the first quality layers, and a current picture decoder that reconstructs the current picture according to a relation indicated by the dependency ID.

BRIEF DESCRIPTION OF THE DRAWINGS

The above and other aspects of the present invention will become apparent by describing in detail exemplary embodiments thereof with reference to the attached drawings, in which:

FIGS. 5A and 5B illustrate a quality layer truncating method used in a current SVC standard;

FIG. 6A depicts a configuration of a current SVC system;

DETAILED DESCRIPTION OF EXEMPLARY EMBODIMENTS OF THE INVENTION

Advantages and features of the aspects of the present invention and methods of accomplishing the same may be understood more readily by reference to the following detailed description of exemplary embodiments and the accompanying drawings.

The aspects of the present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Figure 6B:
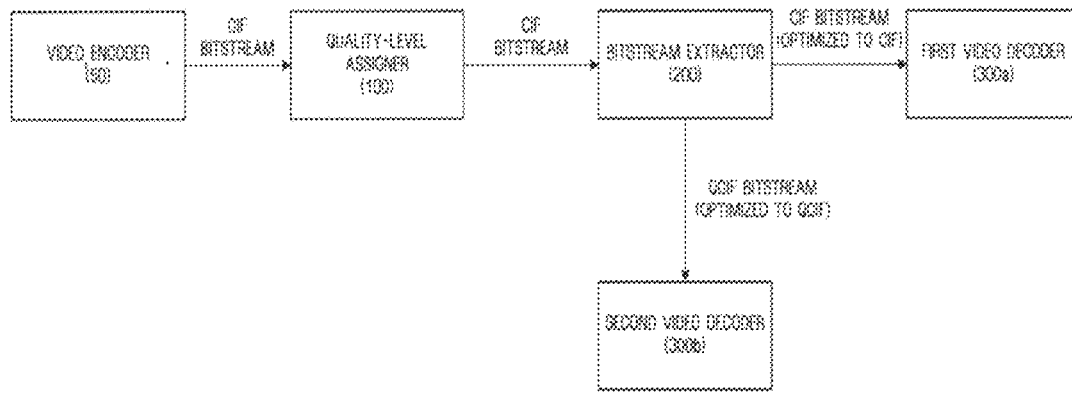
FIG. 6B depicts a configuration of a SVC system according to an exemplary embodiment of the present invention.

FIG. 6A depicts a configuration of a current SVC system. FIG. 6B depicts a configuration of a SVC system according to an exemplary embodiment of the present invention.

Referring to FIG. 6A, a video encoder 61 generates a multi-layer scalable bitstream, e.g., a CIF bitstream. A bitstream extractor 62 may transmit the generated CIF bitstream to a first video decoder 63 as it is, or may extract a QCIF bitstream having a low resolution by truncating part of higher layers, and transmit the QCIF bitstream to a second video decoder 64. In the above two cases, the bitstream extractor 62 can make the resolution of the bitstreams the same and change only their SNR.

Referring to FIG. 6B, a quality level (priority) of a CIF bitstream generated in a video encoder 50 is assigned by a quality-level assigner 100. That is, a priority ID is assigned by a network abstraction layer (NAL) unit that composes the CIF bitstream, which follows a priority ID assigning method considering multi-layers of the exemplary embodiment of the present invention.

When transmitting a bitstream to a second video decoder 300b, a bitstream extractor 200 truncates an upper layer, and transmits the optimized bitstream to QCIF (a lower layer). When a quality layer is truncated in order to control the SNR, the traditional method is used.

When transmitting a bitstream to a first video decoder 300a, however, the bitstream extractor 200 transmits a CIF bitstream including all layers. When a quality layer is truncated in order to control the SNR, the bitstream extractor 200 truncates quality layers having a low priority ID and upward, based on the priority ID assigned by the quality-level assigner 100.

Figure 7:
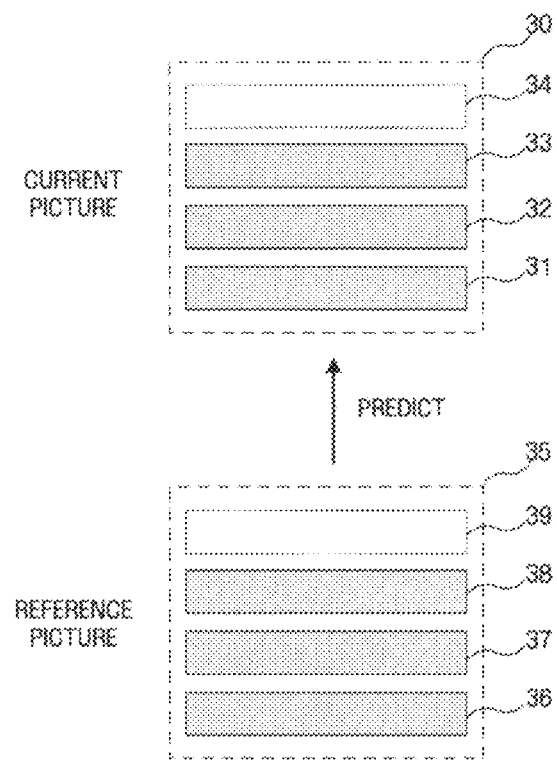
FIG. 7 illustrates an example of truncating a quality layer according to an exemplary embodiment of the present invention.

FIG. 7 illustrates an example of truncating a quality layer according to an exemplary embodiment of the present invention. Referring to FIG. 7, the quality-level assigner 100 assigns priority IDs according to the following order and the bitstream extractor 200 embodies a SNR scalability by truncating a quality layer having a low priority ID and upward.

The quality-level assigner 100 verifies a reference-relation in the input bitstream. The reference-relation is used for a prediction that includes inter prediction and intra-base prediction. For the prediction method, a picture that is referring to is a current picture 30, and a picture that is referred to is a reference picture 35. Especially, FIG. 7 illustrates the number of quality layers of the current picture 30 is identical with that of the reference picture 35, the number of quality layers of the current picture 30 may also be different from that of the reference picture 35.

To assign the priority ID, after comparing a first case, in which the highest quality layer of the current picture 30 is truncated, and a second case, in which the highest quality layer of the reference picture 30 is truncated, the more advantageous case, in terms of picture quality, is selected. The first case means a case of reconstructing an image of a layer to which the current picture belongs from three quality layers 31, 32 and 33 of the current picture 30 and four quality layers 36, 37, 38 and 39 of the reference picture 35. The second case means a case of reconstructing an image of a layer to which the current picture belongs from four quality layers 31, 32, 33 and 34 of the current picture 30 and three quality layers 36, 37 and 38 of the reference picture 35.

A detailed process of reconstructing a picture includes reconstructing the reference picture 35 from quality layers that compose the reference picture 35, reconstructing a residual signal of the current picture 30 from the quality layers that compose the current picture 30, and adding the reconstructed reference picture 35 and the reconstructed residual signal.

When the first and the second cases are obtained, cost of each case is compared. Rate-distortion function is generally used as a cost calculating method. The following Equation 1 shows a process of calculating cost:

$$C = E + \lambda \times B, \quad \text{(Equation 1)}$$

where "C" is cost, and "E" is the difference from an original signal (e.g., which can be calculated by mean square error (MSE)). "B" is the bit rate consumed when the data is compressed, and $\lambda$ is a Lagrangian multiplier. The Lagrangian multiplier is used to control a reflection-rate of E and B. C becomes smaller as E and B decrease, which means that efficient encoding was performed.

When a case of which cost is less, of the first and the second cases, is selected, a priority ID is assigned according to the selected case. If the first case is selected, a lowest priority ID, i.e., "0" is set to the quality layer 34 of the current picture 30 because the quality layer 34 has a smallest influence on a total video quality, when the quality layer 34 is truncated.

The priority ID is set for the remaining quality layers 31, 32 and 33 of the current picture 30, and the remaining quality layers 36, 37, 38 and 39 of the reference picture 35, which is the same as the comparison of the first and the second cases. That is, after comparing a first case, in which the highest quality layer of the remaining quality layers 31, 32 and 33 is truncated, and a second case, in which the highest quality layer of the remaining quality layers 36, 37, 38 and 39 is truncated, the case of which cost is less is selected.

If the process of selecting one of a case, in which the highest quality layer of the remaining quality layers where a priority ID is not assigned is truncated in the current picture 30, and a case, in which the highest quality layer of the remaining quality layers where a priority ID is not assigned is truncated in the reference picture 35, is repeated, the priority ID is assigned for each quality layer of the current picture 30 and the reference picture 35.

The quality-level assigner 100 records the priority ID to a header of the NAL unit (NAL header) corresponding to each quality layer.

Figure 8:
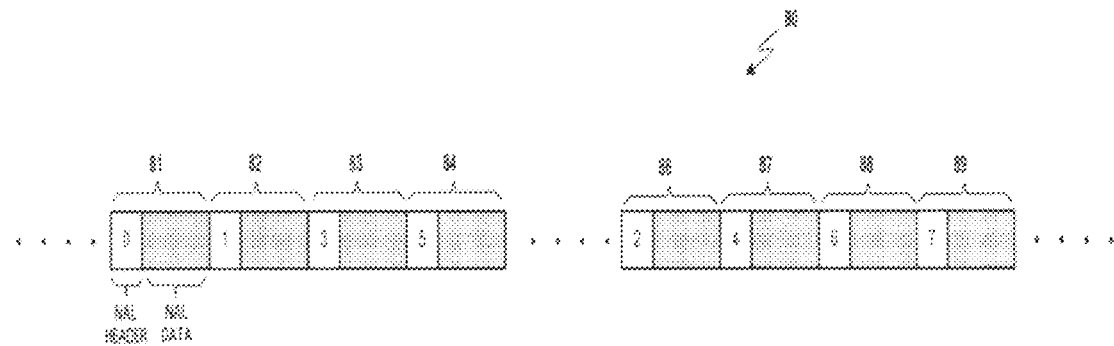
FIG. 8 depicts a bitstream that a priority ID is assigned to according to an exemplary embodiment of the present invention.

FIG. 8 depicts a bitstream 80 in which a priority ID is assigned to according to an exemplary embodiment of the present invention. Quality layers for the current picture 30 are recorded as a plurality of NAL units 81, 82, 83 and 84. Quality layers for the reference picture 35 are recorded as a plurality of NAL units 86, 87, 88 and 89. One NAL unit consists of a NAL header and a NAL data field. The NAL header includes the priority ID as a part indicating additional information on the NAL data. The encoding data corresponding to each quality layer is recorded in the NAL data field.

In FIG. 8, the priority ID set by the quality-level assigner 100 is displayed in the NAL header. The bitstream extractor 200 controls the SNR of the bitstream with reference to the priority ID. The bitstream extractor 200 truncates the NAL units from the lowest priority ID and upward (i.e., in the order of 81, 82, 86, 83, 87, 84, 88 and 89), thereby minimizing a video quality reduction due to a truncation of the NAL units.

The above process is optimized for a video quality of the upper layer (when transmitting a bitstream to the first video decoder 300a in FIG. 6B). To optimize for a video quality of the lower layer (when transmitting a bitstream to the second video decoder 300b in FIG. 6B), the traditional method of truncating from the highest quality layer and downward may be used, regardless of the priority ID.

As suggested in the exemplary embodiment of the present invention, quality layers of a base layer (to which the reference picture belongs) may be truncated prior to those of a current layer (to which the current picture belongs). In this case, a quality layer of the base layer, indicated by a dependency ID of a quality layer of the current layer may not exist. The dependency ID shows a dependency-relation between data, which is decoded first and is referred to, in order to decode data. Accordingly, if a quality layer of the base layer referred to by the dependency ID does not exist in the video decoding process, the dependency ID may use a method of referring the highest quality layer of the remaining quality layers.

Figure 9:
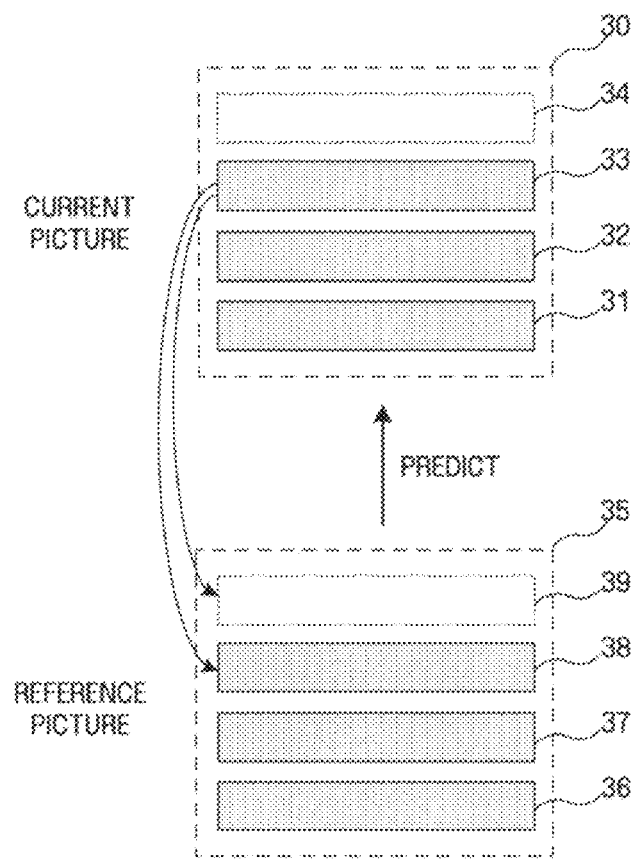
FIG. 9 illustrates a case where a quality layer indicated by a dependency ID does not exist in a reference picture, according to an exemplary embodiment of the present invention.

Referring to FIG. 9, the highest quality layer 34 of the current picture 30 and the highest quality layer 39 of the reference picture 35 are truncated by the bitstream extractor 200. According to an exemplary embodiment of the present invention, since a quality layer of the lower layer may be truncated before all quality layers of the upper layer are truncated, a dependency ID of the quality layer 33 in the current picture 30 may be indicate the quality layer 39 that was already truncated. This case has to be modified as the dependency ID of the quality layer in the video decoder indicates the highest quality layer 38 among the remaining quality layers 36, 37 and 38 of the reference picture 35.

Figure 10:
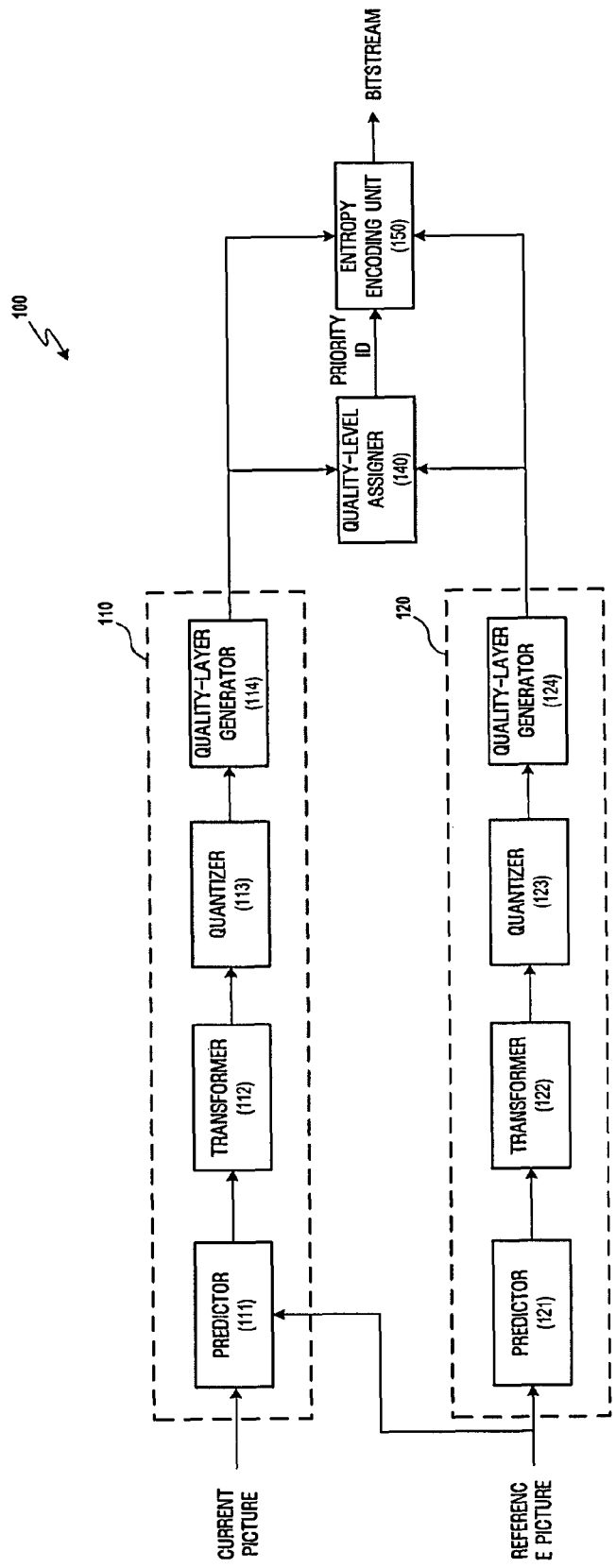
FIG. 10 is a block diagram showing a configuration of a priority-assigning apparatus according to an exemplary embodiment of the present invention.
Figure 11:
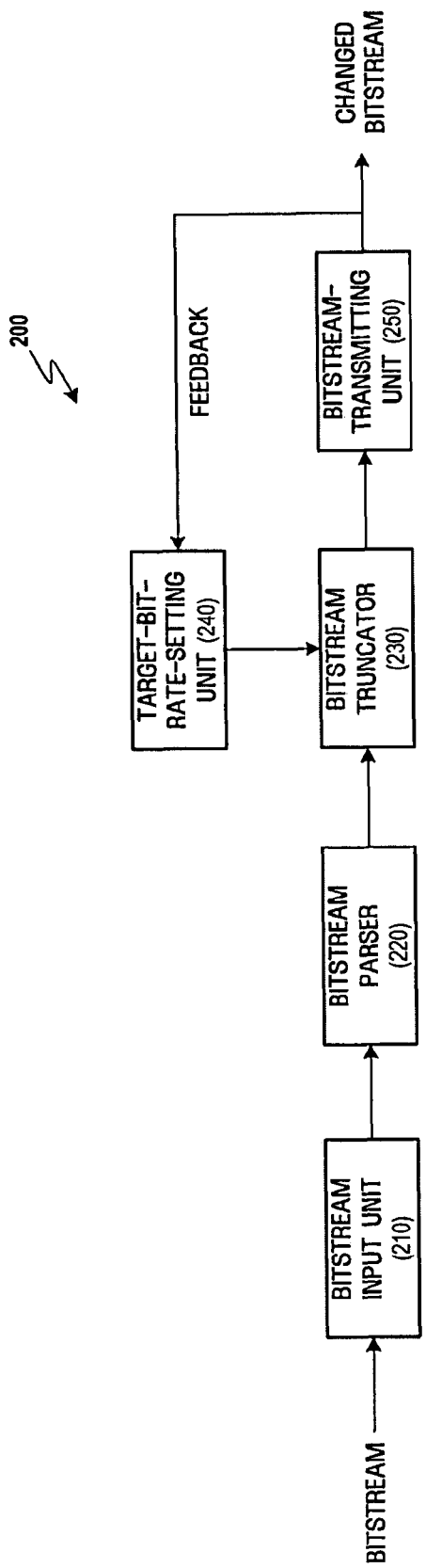
FIG. 11 is a block diagram showing a configuration of a bitstream extractor according to an exemplary embodiment of the present invention.
Figure 12:
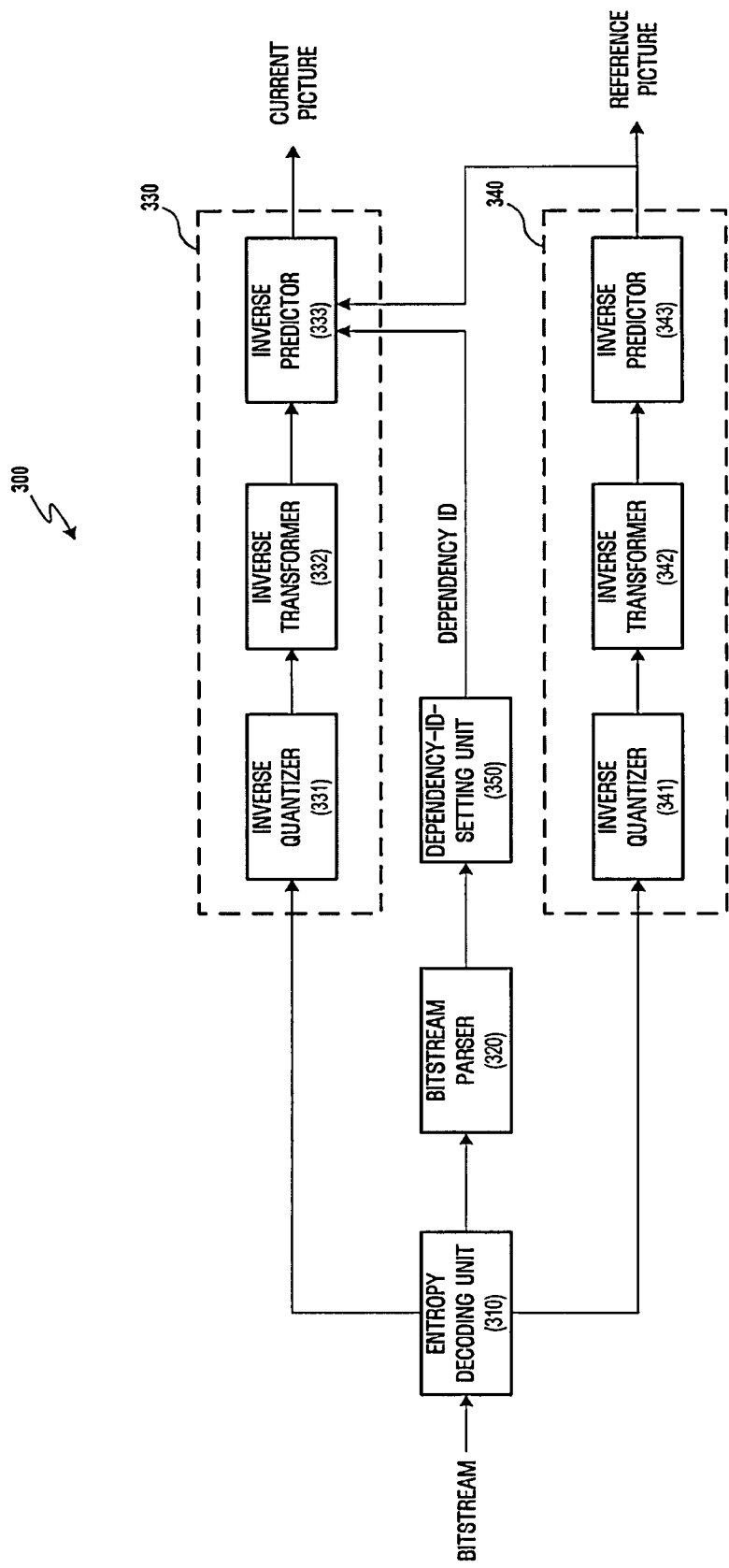
FIG. 12 is a block diagram showing a configuration of a video decoder according to an exemplary embodiment of the present invention.

FIGS. 10 through 12 are block diagrams showing configurations of an apparatus according to an exemplary embodiment of the present invention. FIG. 10 is a block diagram showing a configuration of a priority-assigning apparatus according to an exemplary embodiment of the present invention. The priority-assigning apparatus 100 assigns a priority by a quality level in order to control a bit rate of the bitstream.

The priority-assigning apparatus 100 may include a current picture encoder 110, a reference-picture encoder 120, a quality-level assigner 140, and an entropy encoding unit 150.

The reference-picture encoder 120 composes quality layers (referred to as a first quality layers) for a reference picture. The reference-picture encoder 120 includes a predictor 121, a transformer 122, a quantizer 123, and a quality-layer generator 124.

Figure 1:
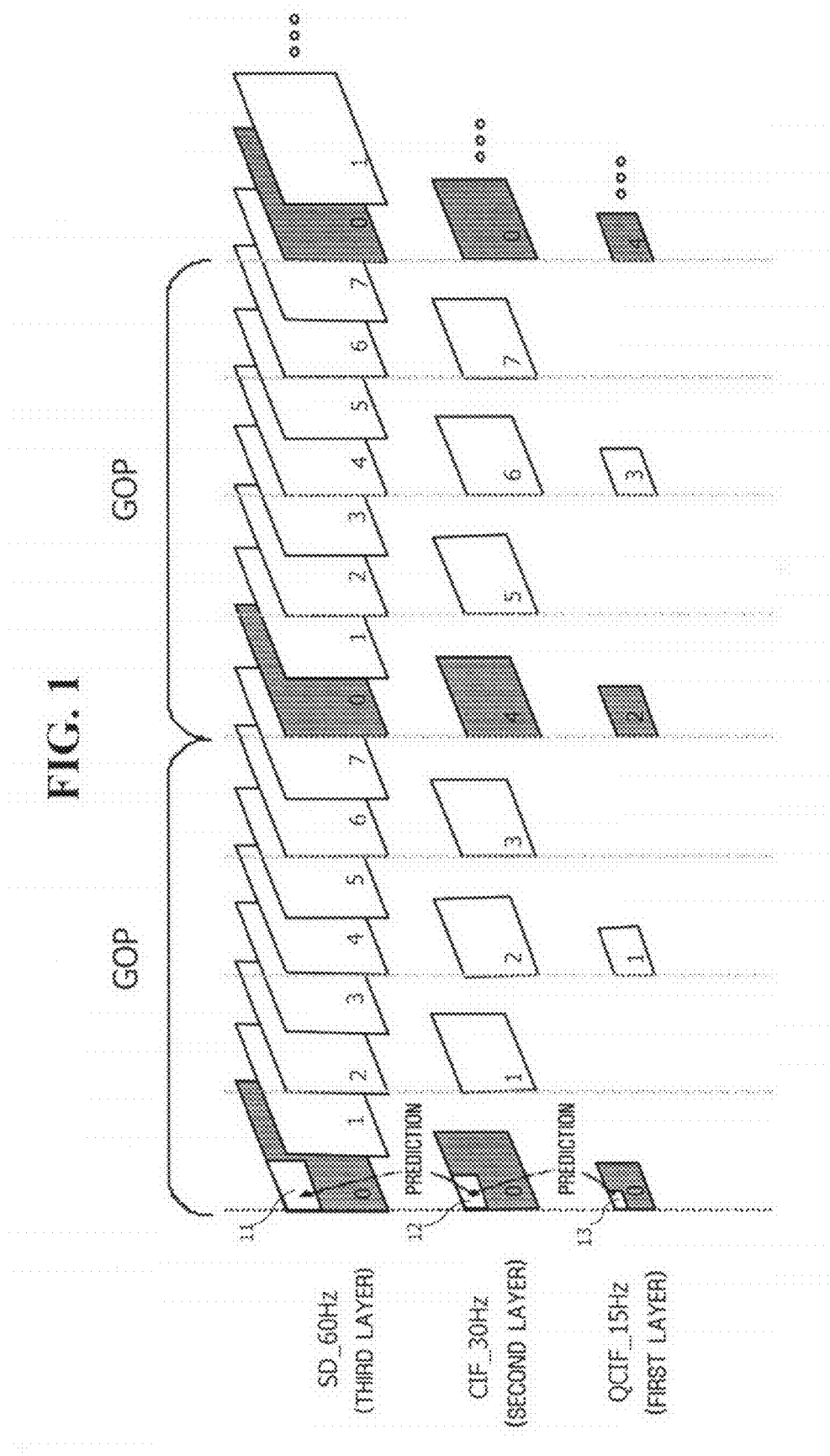
FIG. 1 illustrates an example of a scalable video coding method using a multi-layer structure.
Figure 2:
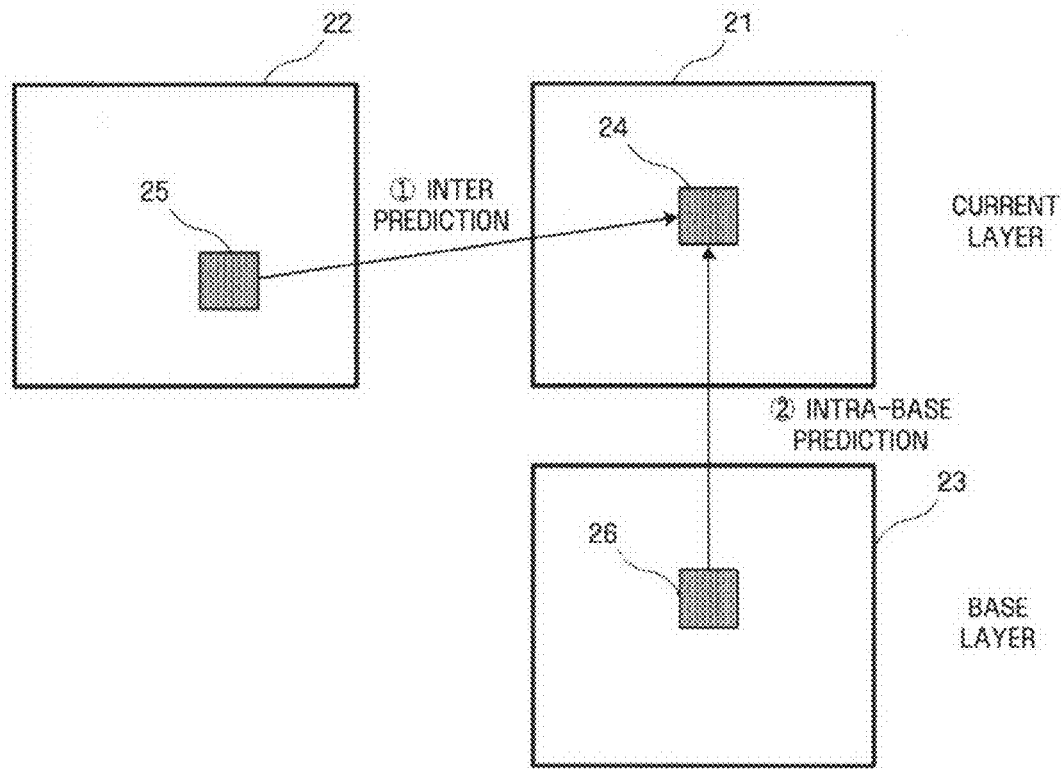
FIG. 2 is a schematic diagram for explaining inter prediction and intra-base prediction of a scalable video coding method.
Figure 3:
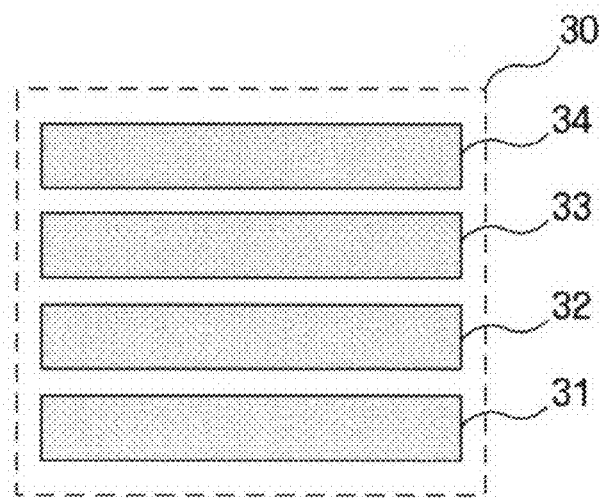
FIG. 3 illustrates an example of applying FGS to a residual picture through the prediction of FIG. 2.

A predictor 121 obtains a residual signal by subtracting the predicted image according to a predetermined prediction. As the predetermined prediction, there are inter prediction and intra-base prediction as illustrated in FIG. 2. The inter prediction includes motion estimation that obtains a motion vector for expressing a relative motion between a current picture and a picture having the same resolution as the current picture and a different temporal position from the current picture.

The current picture may be predicted with reference to a lower layer (base layer) picture that locates on the same temporal position with the current picture and has a different resolution, which is called the intra-base prediction. In the intra-base prediction, the motion estimation is not required.

The transformer 122 performs a spatial transform method on the residual frame to create a transform coefficient. The spatial transform method may include a Discrete Cosine Transform (DCT), or wavelet transform. Specifically, DCT coefficients may be created in a case where DCT is employed, and wavelet coefficients may be created in a case where wavelet transform is employed.

The quantizer 123 quantizes the transform coefficient received from the transformer 122. Quantization means the process of expressing the transform coefficients formed in arbitrary real values by discrete values. As the quantization, there are scalar quantization and vector quantization. The scalar quantization means the process of dividing the transform coefficients by a quantizing parameter, and rounding to an integer.

Figure 4:
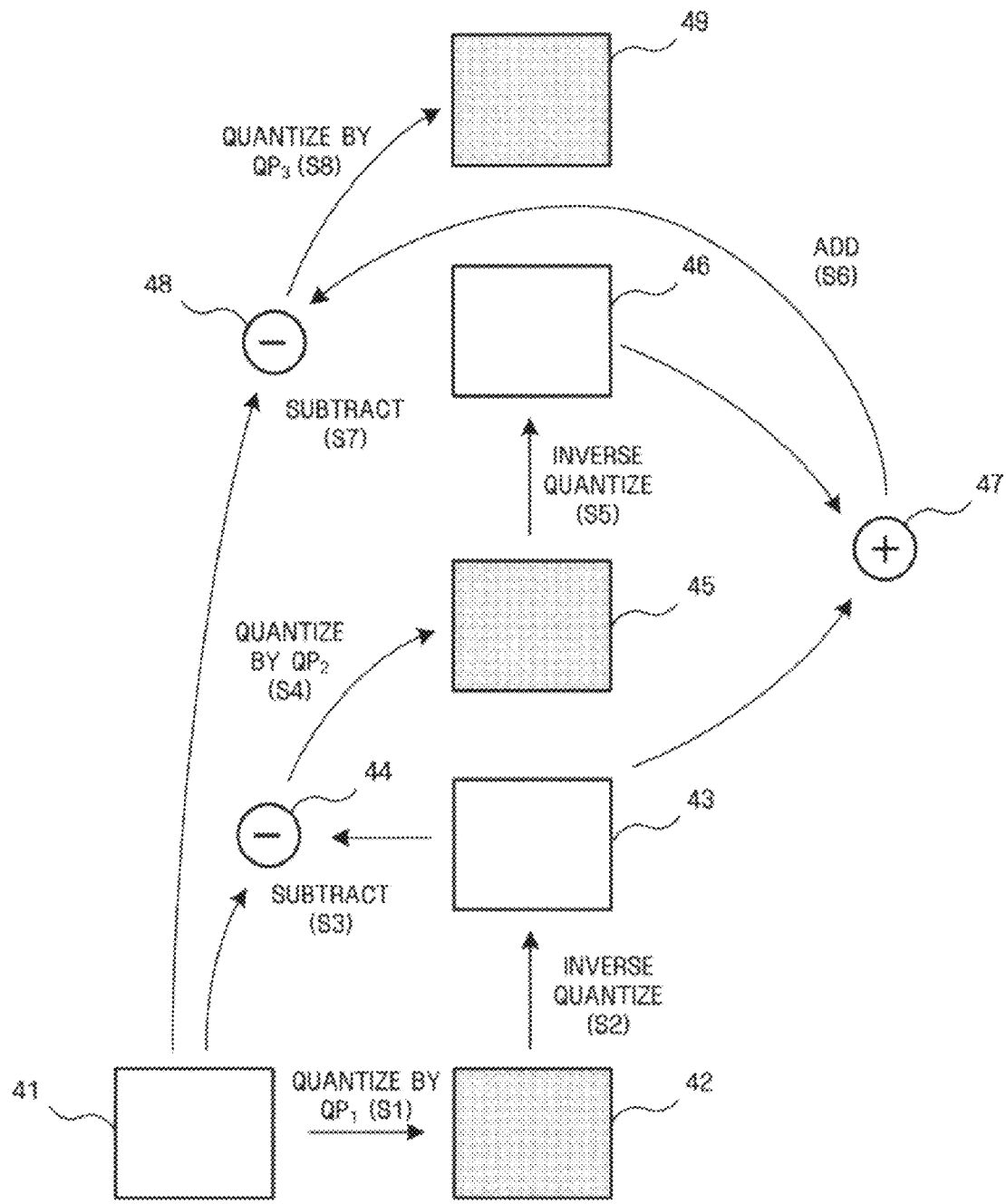
FIG. 4 illustrates a process of expressing a single picture or slice as one discrete layer and two FGS layers.
Figure 5A:
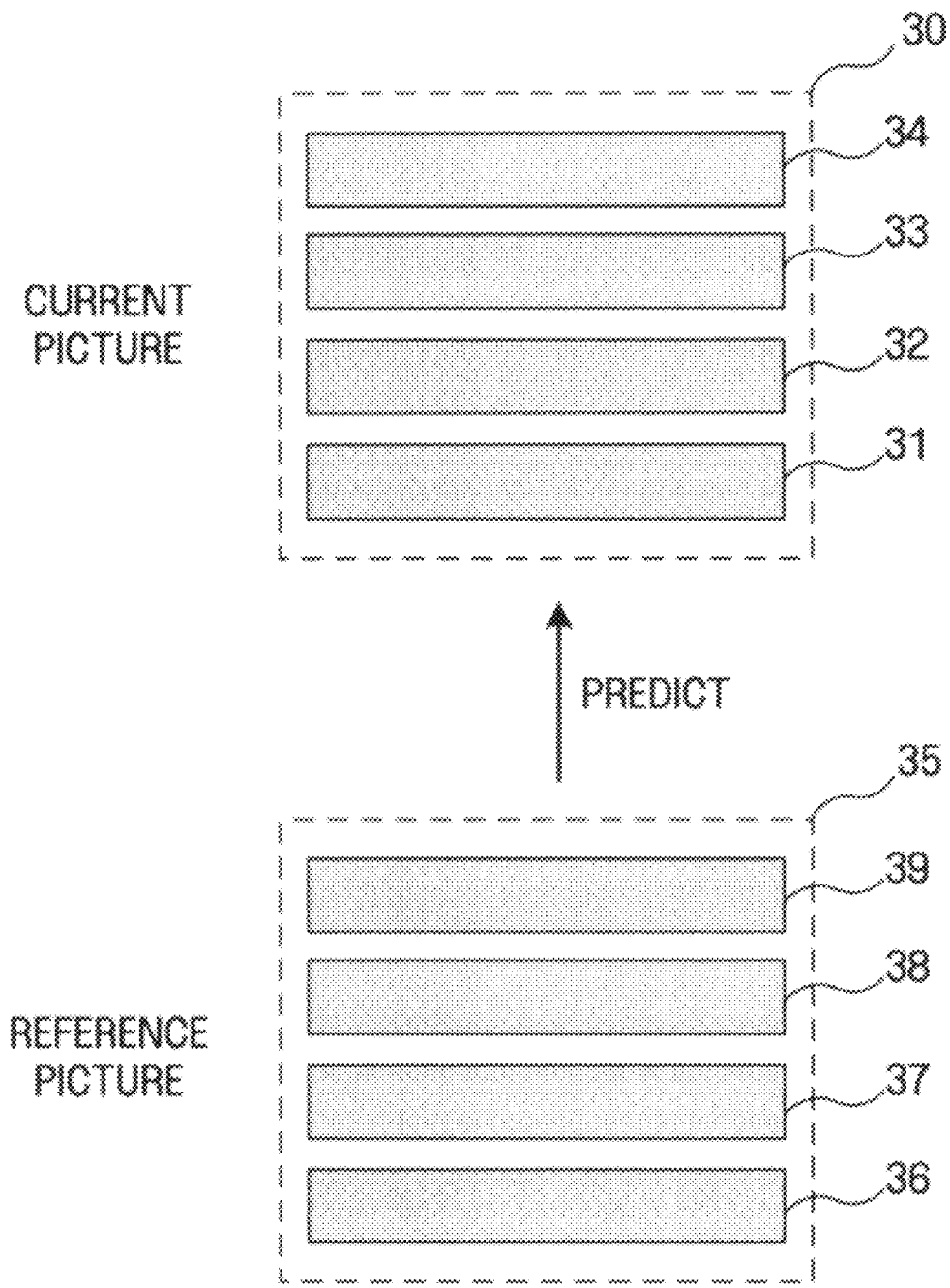

The quality-layer generator 124 generates a plurality of quality layers through the process described in FIG. 4. The plurality of quality layers may consist of one discrete layer and at least two FGS layers.

The current-picture encoder 110, like the reference-picture encoder 120, includes a predictor 111, a transformer 112, a quantizer 113, and a quality-layer generator 114. Operations of each element of the current-picture encoder 110 are the same as the reference-picture encoder 120. However, the reference picture input to the reference-picture encoder 120 is used as a picture used to predict the current picture in the predictor 111. The predictor 111 performs the inter prediction or the intra-base prediction by using the input reference picture, and generates a residual signal.

The current-picture encoder 110 composes quality layers (referred to as a second quality layers) for the current picture, more accurately, for a residual signal of the current picture. The input reference picture may be different from the current picture in its resolution, in case of the intra-base prediction, and its temporal level, in case of the inter prediction.

The quality-level assigner 140 assigns a priority ID to each the first and the second quality layers. The priority assignment is performed by a method of assigning a lower priority to a quality layer that has a small influence on a video collection reduction of the current picture, and assigning a higher priority to quality layer that has a great influence (see FIG. 7).

As a standard for determining the video quality reduction, a cost function like Equation 1 may be used. The cost function may be expressed by adding a difference from an original image and a bit rate consumed in encoding.

The entropy encoding unit 150 encodes the priority ID determined by the quality-level assigner 140, the first quality layers for the reference picture, and the second quality layers for the current picture in order to generate bitstream. The entropy encoding is a lossless coding method using a statistical feature of data, which includes arithmetic coding, variable length coding, and so on.

FIG. 11 is a block diagram showing a configuration of a bitstream extractor according to an exemplary embodiment of the present invention.

The bitstream extractor 200 includes a bitstream input unit 210, a bitstream parser 220, a bitstream truncator 230, a target-bit-rate-setting unit 240, and a bitstream-transmitting unit 250.

The bitstream input unit 210 receives a video bitstream from the priority-assigning apparatus 100. The bitstream-transmitting unit 250 transmits the bitstream of which bit rate is changed to a video decoder. The bitstream input unit 210 corresponds to a receiving unit of a network interface. The bitstream-transmitting unit 250 corresponds to a transmitting unit of the network interface.

The target-bit-rate-setting unit 240 sets a target bit rate of the video bitstream. The target bitstream may be determined in collective consideration of a bit rate of the transmitting bitstream, a network state, and a function of devices of receiving layer (video decoder).

The bitstream parser 220 reads priority IDs of the first quality layers for the reference picture and the second quality layers for the current pictures. The priority ID is assigned by the quality-level assigner 140 of the priority-assigning apparatus 100.

The bitstream truncator 230 truncates from a lower quality layer and upward of the first and the second quality layers according to the target bit rate. The truncation is repeated until when attaining the target bit rate.

FIG. 12 is a block diagram showing a configuration of a video decoder according to an exemplary embodiment of the present invention.

The video decoder 300 includes an entropy decoding unit 310, a bitstream parser 320, a current picture decoding unit 330, a reference picture decoding unit 340, and a dependency-ID-setting unit 350.

The entropy decoding unit 310 receives a video bitstream from the bitstream extractor 200, and losslessly decodes it. The lossless decoding is performed as an inverse operation of the lossless encoding in the entropy encoding unit 150 of the priority-assigning apparatus 100.

The bitstream parser 320 reads encoded data for the reference picture (first quality layers), encoded data for the current pictures (second quality layers), dependency IDs of the first quality layers for the reference picture, and dependency IDs of the second quality layers for the current pictures. The dependency ID shows that information on a quality layer of the reference picture is required in order to reconstruct a quality layer of the current layer, i.e., a dependency-relation.

As described in FIG. 9, since quality layers of a lower layer may be truncated prior to those of an upper layer, a quality layer of the current layer may indicate a quality layer of which a dependency ID was already truncated.

The dependency-ID-setting unit 350 set as the dependency ID indicates the highest quality layer of the remaining quality layers.

The reference picture decoding unit 340 includes an inverse quantizer 341, an inverse transformer 342, and an inverse predictor 343 in order to decode encoded data of the reference picture.

The inverse quantizer 341 inverse-quantizes encoded data of the reference picture.

The inverse transformer 342 performs an inverse-transformation of the inverse-quantized result. The inverse-transformation is performed as an inverse operation of the transformation in the transformer 122 of FIG. 10.

The inverse predictor 343 adds the reconstructed residual signal provided by the inverse transformer 342 and a prediction signal for reconstructing the reference picture. At this time, the prediction signal is obtained by the inter prediction or the intra-base prediction like in the video encoder.

The current picture decoding unit 330 decodes encoded data of the current picture according to the dependency ID. The current picture decoding unit 330 includes an inverse quantizer 331, an inverse transformer 332, and an inverse predictor 333. Operations of each element of the current picture decoding unit 330 are the same as the reference picture decoder 340. However, the inverse predictor 333 reconstructs the current picture from the reconstructed residual signal of the current picture provided by the inverse transformer 332 using the reconstructed reference picture as the prediction signal, i.e., adds the residual signal and the prediction signal. At this time, a dependency ID read by the bitstream parser 320 or a modified dependency ID is used. The dependency ID indicates the first quality layers for the reference picture that is required to reconstruct the second quality layers for the current picture.

The term "picture," as used herein, means a single frame. However, the picture can be a "slice," which will be understood by those of ordinary skill in the art.

The components shown in FIGS. 10, 11, and 12 may be implemented in software such as a task, class, sub-routine, process, object, execution thread or program, which is performed on a certain memory area, and/or hardware such as a Field Programmable Gate Array (FPGA) or an Application Specific Integrated Circuit (ASIC). The components may also be implemented as a combination of software and hardware. Further, the components may advantageously be configured to reside on computer-readable storage media, or to execute on one or more processors.

As described above, an exemplary embodiment of the present invention can control the bit rate of bitstreams by mainly aiming at a video quality of a high layer picture.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of using a priority-assigning apparatus to assign a priority for controlling a bit rate of a bitstream, the method comprising: using the priority-assigning apparatus to compose first quality layers for a reference picture; using the priority-assigning apparatus to compose second quality layers for a current picture that is encoded with reference to the reference picture; and using the priority-assigning apparatus to assign a priority to each of the first and the second quality layers, wherein a low priority is assigned to a quality layer from among the first quality layers and the second quality layers having a small influence on a video quality reduction of the current picture, when the quality layer is truncated.

2. The method of claim 1, wherein the reference picture and the current picture are frames or slices.

3. The method of claim 1, wherein the reference picture and the current picture have a different resolution or a different temporal level.

4. The method of claim 1, wherein the first and the second quality layers comprise one discrete layer and at least two fine granularity scalability (FGS) layers, respectively.

5. The method of claim 4, wherein the composing first quality layers and the composing the second quality layers comprises:
obtaining a residual signal by predicting the reference picture or the current picture;
generating a transform coefficient by transforming the residual signal;
composing the discrete layer by quantizing the transform coefficient through a first quantization parameter;
subtracting the quantized result from the residual signal; and
composing the at least two FGS layers by quantizing the subtracted result through a second quantization parameter.

6. The method of claim 1, wherein the quality layer having a small influence on the video quality reduction is a quality layer of which the cost for encoding is less than other quality layers.

7. The method of claim 6, wherein the cost is adding a difference from an original image and a bit rate consumed in encoding.

8. A method of using a bitstream extractor to control a bit rate of a bitstream, the method comprising:

using the bitstream extractor to receive a video bitstream;
using the bitstream extractor to set a target bit rate for the video bitstream;
using the bitstream extractor to read first quality layers for a reference picture and second quality layers for a current picture; and
using the bitstream extractor to truncate from a quality layer having a low priority and upward, among the first and the second quality layers, based on the target bit rate.

9. The method of claim 8, wherein the reference picture and the current picture are frames or slices.

10. The method of claim 8, wherein the reference picture and the current picture have a different resolution or a different temporal level.

11. The method of claim 8, wherein the first and the second quality layers comprise one discrete layer and at least two fine granularity scalability (FGS) layers, respectively.

12. A video decoding method comprising:
using a video decoder to receive a video bitstream;
using a video decoder to receive first quality layers for a reference picture, second quality layers for a current picture, and dependency IDs of the first and the second quality layers;
using a video decoder to set the dependency ID as indicating the highest quality layer of the first quality layers, if there is no quality layer indicated by the dependency ID among the first quality layers; and
using a video decoder to reconstruct the current picture according to a relation indicated by the dependency ID.

13. The method of claim 12, wherein the reference picture and the current picture are frames or slices.

14. The method of claim 12, wherein the reference picture and the current picture have different resolutions or different temporal levels.

15. The method of claim 12, wherein the first quality layers and the second quality layers comprise one discrete layer and at least two fine granularity scalability (FGS) layers, respectively.

16. The method of claim 12, wherein the reconstructing of the current picture comprises:
reconstructing the reference picture according to the dependency ID;
reconstructing a residual signal of the current picture; and
adding the reconstructed reference picture and the reconstructed residual signal.

17. An apparatus for assigning a priority for controlling a bit rate of a bitstream, the apparatus comprising: a reference-picture encoder that composes first quality layers for a reference picture; a current-picture encoder that composes second quality layers for a current picture that is encoded with reference to the reference picture; and a quality-level assigner that assigns a priority to each of the first and the second quality layers, wherein a low priority is assigned to a quality layer from among the first quality layer and the second quality layer having a small influence on a video quality reduction of the current picture when the quality layer is truncated.

* * * * *